United States Patent
Irie

(10) Patent No.: US 11,505,703 B2
(45) Date of Patent: Nov. 22, 2022

(54) CURABLE SILICONE RUBBER COMPOSITION

(71) Applicant: DOW TORAY CO., LTD., Tokyo (JP)

(72) Inventor: Masakazu Irie, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 279 days.

(21) Appl. No.: 16/767,962

(22) PCT Filed: Nov. 16, 2018

(86) PCT No.: PCT/JP2018/042583
§ 371 (c)(1),
(2) Date: May 28, 2020

(87) PCT Pub. No.: WO2019/107196
PCT Pub. Date: Jun. 6, 2019

(65) Prior Publication Data
US 2020/0369885 A1   Nov. 26, 2020

(30) Foreign Application Priority Data
Nov. 30, 2017   (JP) .............................. JP2017-230947

(51) Int. Cl.
*C08L 83/04* (2006.01)
*C08K 5/5455* (2006.01)

(52) U.S. Cl.
CPC ............ *C08L 83/04* (2013.01); *C08K 5/5455* (2013.01)

(58) Field of Classification Search
CPC ....... C08L 83/04; C08L 43/04; C08K 5/5455; C08K 5/21
See application file for complete search history.

(56) References Cited

U.S. PATENT DOCUMENTS

| | | | |
|---|---|---|---|
| 3,837,876 A | 9/1974 | Mayuzumi et al. | |
| 4,460,739 A | 7/1984 | Ashby | |
| 4,506,058 A | 3/1985 | Ashby | |
| 4,735,979 A | 4/1988 | Beers et al. | |
| 4,788,310 A | 11/1988 | Stein et al. | |
| 4,794,192 A | 12/1988 | Stein | |
| 4,826,915 A | 5/1989 | Stein et al. | |
| 4,847,396 A | 7/1989 | Beers et al. | |
| 5,416,144 A * | 5/1995 | Stein ...................... | C08L 83/04 524/588 |
| 2010/0316953 A1 | 12/2010 | Suwa et al. | |

FOREIGN PATENT DOCUMENTS

| | | | |
|---|---|---|---|
| CA | 1311329 C | 12/1992 | |
| EP | 2474573 A1 | 7/2012 | |
| JP | S528854 B2 | 3/1977 | |
| JP | S5541702 B2 | 10/1980 | |
| JP | 6049077 A | 3/1985 | |
| JP | 60238364 A | 11/1985 | |
| JP | S63500178 A | 1/1988 | |
| JP | 6487660 A | 3/1989 | |
| JP | H0532397 B2 | 5/1993 | |
| JP | H07113083 B2 | 12/1995 | |
| JP | 2004075836 A | * | 3/2004 |
| JP | 2012025876 A | 2/2012 | |
| JP | 2012131898 A | 7/2012 | |
| WO | 199207896 A1 | 5/1992 | |
| WO | 2009096050 A1 | 8/2009 | |
| WO | 2014104195 A1 | 7/2014 | |

OTHER PUBLICATIONS

Machine translation of JP 2004-075836 (2004, 7 pages).*
Kaneka (Kaneka MS Polymer S203H Technical Data Sheet, Kaneka North America, 2022, 2 pages).*
English translation of International Search Report for PCT/JP2018/042583 dated Feb. 12, 2019, 2 pages.
Machine assisted English translation of JPS5541702B2 obtained from https://worldwide.espacenet.com on May 28, 2020, 5 pages.
Machine assisted English translation of JP2012025876A obtained from https://patents.google.com/patent on May 28, 2020, 12 pages.
Machine assisted English translation of WO2014104195A1 obtained from https://patents.google.com/patent on May 28, 2020, 17 pages.
English translation of JP200475836A, 12 pages.
Website for Kaneka MS Polymer: www.kanekamspolymer.com (accessed on Aug. 3, 2022), 2 pages.
Website for MS Polymer S203H: https://www.knowde.com/stores/kaneka-north-america/products/ms-polymer-s203h/ (accessed on Aug. 3, 2022), 3 pages.

* cited by examiner

*Primary Examiner* — Brieann R Johnston
(74) *Attorney, Agent, or Firm* — Warner Norcross + Judd LLP

(57) ABSTRACT

The present disclosure provides a curable silicone rubber composition containing 0.1 to 15 mass % of a biuret compound represented by the general formula:

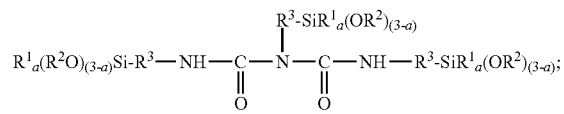

wherein $R^1$ represents the same or different alkyl groups having 1 to 6 carbons, $R^2$ represents the same or different alkyl groups having 1 to 3 carbons, $R^3$ represents the same or different alkylene groups having 2 to 6 carbons, and "a" represents the same or different integers of from 0 to 2. The curable silicone rubber composition may be cured by a condensation reaction, an addition reaction, or the like. The curable silicone rubber composition generally has good adhesion to plastics, metals, and the like.

7 Claims, No Drawings

CURABLE SILICONE RUBBER COMPOSITION

CROSS-REFERENCE TO RELATED APPLICATIONS

This application is the National Stage of International Appl. No. PCT/JP2018/042583 filed on 16 Nov. 2018, which claims priority to and all advantages of Japanese Appl. No. 2017-230947 filed on 30 Nov. 2017, the content of which is hereby incorporated by reference.

TECHNICAL FIELD

The present invention relates to a curable silicone rubber composition having excellent adhesion.

BACKGROUND ART

To enhance adhesion of curable silicone rubber compositions, curable silicone rubber compositions containing a reaction mixture of an aminoalkyl alkoxysilane and an epoxy alkyl alkoxysilane (see Patent Documents 1 to 3) or curable silicone rubber compositions containing a cyclic aminoalkyl alkoxysilane (see Patent Document 4), for example, have been proposed.

However, even with such curable silicone rubber compositions, there is a problem in that the adhesion in a short period of time for plastics such as polycarbonate resins, metals, and the like, and heat-resistant adhesion are insufficient.

PRIOR ART DOCUMENTS

Patent Documents

Patent Document 1: Japanese Examined Patent Application Publication No. S52-8854
Patent Document 2: Japanese Examined Patent Application Publication No. S55-41702
Patent Document 3: Japanese Examined Patent Application Publication No. H7-113083
Patent Document 4: Japanese Examined Patent Application Publication No. H5-32397

SUMMARY OF THE INVENTION

Problems to be Solved by the Invention

An object of the present invention is to provide a curable silicone rubber composition having excellent adhesion to plastics, metals, and the like.

Means for Solving the Problems

The present composition contains from 0.1 to 15 mass % of a biuret compound represented by the general formula:

[Formula 1]

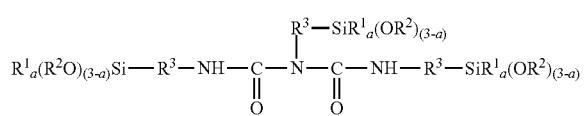

wherein $R^1$ represents the same or different alkyl groups having 1 to 6 carbons, $R^2$ represents the same or different alkyl groups having 1 to 3 carbons, $R^3$ represents the same or different alkylene groups having 2 to 6 carbons, and "a" represents the same or different integers of from 0 to 2.

The biuret compound is preferably a reaction product of: an aminoalkyl alkoxysilane represented by the general formula:

wherein $R^1$ is an alkyl group having 1 to 6 carbons, $R^2$ is an alkyl group having 1 to 3 carbons, $R^3$ is an alkylene group having 2 to 6 carbons, and "a" is an integer of from 0 to 2; and an isocyanate alkyl alkoxysilane represented by the general formula:

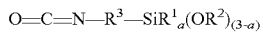

wherein $R^1$ represents the same alkyl groups as described above or different alkyl groups having 1 to 6 carbon, $R^2$ represents the same alkyl groups as described above or different alkyl groups having 1 to 3 carbons, $R^3$ represents the same alkylene group as described above or different alkylene group having 2 to 6 carbons, and "a" represents the same integer as described above or different integer of from 0 to 2,
and is even more preferably a reaction product with a molar ratio of 1:1.5 to 1:3 of the aminoalkyl alkoxysilane and the isocyanate alkyl alkoxysilane described above.

In addition, the present composition is preferably a condensation reaction curable silicone rubber composition. Specifically, the composition preferably comprises:
(A) a biuret compound represented by the general formula:

[Formula 2]

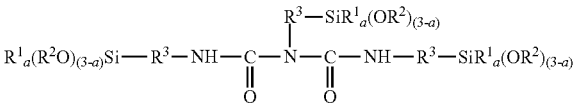

wherein $R^1$ represents the same or different alkyl groups having 1 to 6 carbons, $R^2$ represents the same or different alkyl groups having 1 to 3 carbons, $R^3$ represents the same or different alkylene groups having 2 to 6 carbons, and "a" represents the same or different integers of from 0 to 2, in an amount of from 0.1 to 15 mass % in the present composition;
($B_1$) a diorganopolysiloxane capped at both molecular terminals with silicon atom-bonded hydroxyl groups or silicon atom-bonded hydrolyzable groups;
($B_2$) a silane crosslinking agent having a silicon atom-bonded hydrolyzable group, in an amount sufficient to crosslink component ($B_1$); and
($B_3$) any condensation reaction-promoting catalyst for promoting a condensation reaction of the present composition.

In addition, the present composition is preferably an addition reaction curable silicone rubber composition. Specifically, the composition preferably comprises:
(A) a biuret compound represented by the general formula:

[Formula 3]

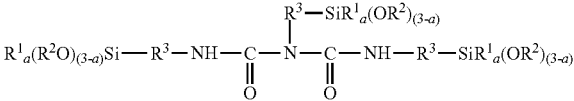

wherein R¹ represents the same or different alkyl groups having 1 to 6 carbons, R² represents the same or different alkyl groups having 1 to 3 carbons, R³ represents the same or different alkylene groups having 2 to 6 carbons, and "a" represents the same or different integers of from 0 to 2, in an amount of from 0.1 to 15 mass % in the present composition;

(C₁) an organopolysiloxane having at least two silicon atom-bonded alkenyl groups in each molecule;

(C₂) an organohydrogenpolysiloxane having at least two silicon atom-bonded hydrogen atoms in each molecule, in an amount sufficient to crosslink component (C₁); and (C₃) a platinum group metal-based catalyst in an amount sufficient to promote an addition reaction of the present composition.

Effects of the Invention

The present composition is characterized by having good adhesion to plastics, metals, and the like.

MODE FOR CARRYING OUT THE INVENTION

The present composition contains a biuret compound represented by the general formula:

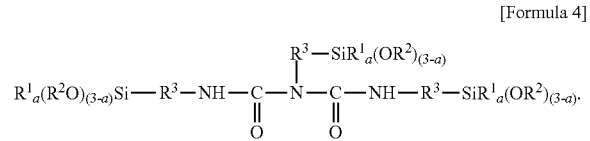

[Formula 4]

In the formula, R₁ represents the same or different alkyl groups having 1 to 6 carbons, specific examples of which include methyl groups, ethyl groups, propyl groups, butyl groups, pentyl groups, and heptyl groups, and methyl groups are preferable.

R₂ represents the same or different alkyl groups having 1 to 3 carbons, specific examples of which include methyl groups, ethyl groups, and propyl groups, and methyl groups and ethyl groups are preferable.

R₃ represents the same or different alkylene groups having 2 to 6 carbons, specific examples of which include ethylene groups, propylene groups, butylene groups, pentylene groups, and hexylene groups, and propylene groups are preferable.

In addition, "a" represents the same or different integers of from 0 to 2, and is preferably 0.

The following are examples of such biuret compounds.

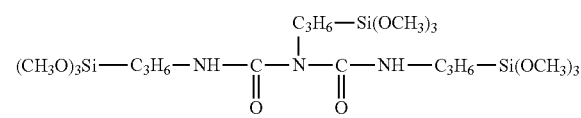

[Formula 5]

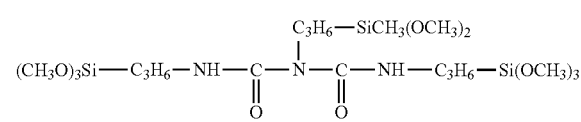

[Formula 6]

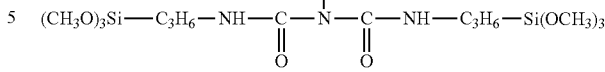

[Formula 7]

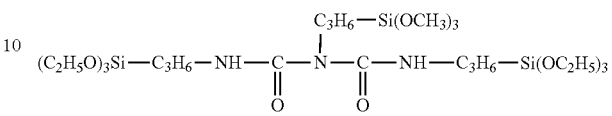

[Formula 8]

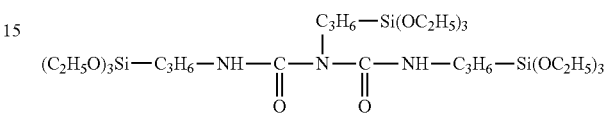

[Formula 9]

Such a biuret compound is preferably a reaction product of an aminoalkyl alkoxysilane represented by the general formula:

$NH_2-R^3-SiR^1{}_a(OR^2)_{(3-a)}$ and an isocyanate alkyl alkoxysilane represented by the general formula:

$O=C=N-R^3-SiR^1{}_a(OR^2)_{(3-a)}$.

In the aminoalkyl alkoxysilane described above, R¹, R², R³, and "a" in the formula are the same as described above.

Examples of such aminoalkyl alkoxysilanes include 3-aminopropyltrimethoxysilane, 3-aminopropylmethyldimethoxysilane, 3-aminopropyltriethoxysilane, N-(2-aminoethyl)-3-aminopropyltrimethoxysilane, N-(2-aminoethyl)-3-aminopropylmethyldimethoxysilane, and N-(2-aminoethyl)-3-aminopropyltriethoxysilane, and 3-aminopropyltrimethoxysilane is preferable.

Meanwhile, in the isocyanate alkyl alkoxysilane described above, R¹, R², R³, and "a" in the formula are the same as described above.

Examples of such isocyanate alkyl alkoxysilanes include 3-isocyanate propyltrimethoxysilane, 3-isocyanate propylmethyldimethoxysilane, and 3-isocyanate propyltriethoxysilane, and 3-isocyanate propyltrimethoxysilane is preferable.

The biuret compound can be prepared by reacting the aminoalkyl alkoxysilane and the isocyanate alkyl alkoxysilane described above, however, the molar ratio of the aminoalkyl alkoxysilane and the isocyanate alkyl alkoxysilane described above are preferably in the range of from 1:1.5 to 1:3 and particularly preferably in the range of from 1:1.5 to 1:2.2 in that the resulting reaction efficiency is high.

This reaction progresses even at ambient temperature, however, in order to shorten the reaction time, it is preferably to heat at 100° C. or lower. In addition, in this reaction, the use of an organic solvent is optional, and examples of organic solvents that can be used include aliphatic hydrocarbons such as hexane, heptane, and octane; aromatic hydrocarbons such as toluene and xylene; ketones such as acetone and methyl isobutyl ketone; ethers such as diethyl ether and tetrahydrofuran; and esters such as ethyl acetate and isoamyl acetate.

In addition to the biuret compound, the reaction product or reaction mixture obtained in this manner may have a residual urea compound formed by a reaction of an aminoalkyl alkoxysilane and an isocyanate alkyl alkoxysilane at a molar ratio of 1:1, or unreacted aminoalkyl alkoxysilane or isocyanate alkyl alkoxysilane, however, these may remain as long as the object of the present invention is not inhibited.

The present composition contains the biuret compound in an amount of from 0.1 to 15 mass %, and preferably from 0.1 to 10 mass %, from 0.1 to 5 mass %, from 0.1 to 3 mass %, or from 0.5 to 2 mass %. This is because when the content of the biuret compound is not less than the lower limit of the range described above, the adhesion of the present composition with respect to plastics, metals, and the like is enhanced, whereas when the content is not greater than the upper limit of the range described above, the storage stability of the present composition is enhanced.

The curing mechanism of the present composition is not limited, and examples thereof include condensation reactions such as a dealcoholization condensation reaction, a dehydration condensation reaction, a dehydrogenation condensation reaction, a deoxime condensation reaction, a deacetic acid condensation reaction, a deacetone condensation reaction, or a dehydroxyamine condensation reaction; an addition reaction; a radical reaction with an organic peroxide; or another radical reaction by UV irradiation.

For example, the present condensation reaction curable composition preferably comprises:

(A) the biuret compound described above, in an amount of 0.1 to 15 mass % in the present composition;

($B_1$) a diorganopolysiloxane capped at both molecular terminals with silicon atom-bonded hydroxyl groups or silicon atom-bonded hydrolyzable groups;

($B_2$) a silane crosslinking agent having a silicon atom-bonded hydrolyzable group, in an amount sufficient to crosslink component ($B_1$); and ($B_3$) any condensation reaction-promoting catalyst for promoting a condensation reaction of the present composition.

The biuret compound of component (A) is as described above.

Examples of the silicon atom-bonded hydrolyzable group in component ($B_1$) include ketoximo groups such as dimethylketoximo groups and methylethylketoximo groups (also called "ketoximino groups", which are groups represented by the general formula: —O—N=$CR^4_2$, wherein $R^4$ represents the same or different alkyl groups having 1 to 6 carbons); alkoxy groups such as methoxy groups and ethoxy groups; acyloxy groups such as acetoxy groups; alkylamino groups such as N-butylamino groups and N,N-diethylamino groups; acylamido groups such as N-methylacetamido groups; N,N-dialkylaminoxy groups such as N,N-diethylaminoxy groups; and alkenyloxy groups such as propenoxy groups; and alkoxy groups, ketoximo groups, amino groups, and aminoxy groups are particularly preferable.

In addition, examples of the silicon atom-bonded organic group in component ($B_1$) include alkyl groups such as methyl groups, ethyl groups, propyl groups, butyl groups, and octyl groups; alkenyl groups such as vinyl groups, allyl groups, and hexenyl groups; aryl groups such as phenyl groups and tolyl groups; and halogenated alkyl groups such as 3,3,3-trifluoropropyl groups, 3-chloropropyl groups, and 3-cyanoalkyl groups.

Further, although a viscosity of component ($B_1$) at 25° C. is not limited, mechanical properties of a cured product become poor when the viscosity is too low, whereas handling and workability are diminished when the viscosity is too high. Therefore, the viscosity is preferably within a range of from 20 to 1,000,000 mPa·s or within the range of from 100 to 100,000 mPa·s. A molecular structure of component ($B_1$) is essentially a straight-chain structure, however, a portion of the molecular chain may be somewhat branched. Examples of the organopolysiloxane unit constituting the main skeleton of such component ($B_1$) include dimethylpolysiloxane units, methylethylpolysiloxane units, methyloctylpolysiloxane units, methylvinylpolysiloxane units, methylphenylpolysiloxane units, methyl(3,3,3-trifluoropropyl)polysiloxane units, dimethylsiloxane.methylphenylsiloxane copolymer units, and dimethylsiloxane.methyl (3,3,3-trifluoropropyl)siloxane units. In addition, the molecular terminals of component ($B_1$) are capped with silicon atom-bonded hydroxyl groups or silicon atom-bonded hydrolyzable groups, however, examples of molecular terminals capped with silicon atom-bonded hydroxyl groups include dimethylhydroxysiloxy groups and methylphenylhydroxysiloxy groups, and examples of molecular terminals capped with silicon atom-bonded alkoxy groups include vinyldimethoxysiloxy groups, methyldimethoxysiloxy groups, trimethoxysiloxy groups, methyldiethoxysiloxy groups, and triethoxysiloxy groups.

Component ($B_2$) is a silane crosslinking agent having at least two and preferably three or four silicon-bonded hydrolyzable groups, and is a silane compound represented by the general formula:

or a bis-silyl alkane compound represented by the general formula:

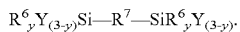

In the formula, $R^5$ is a monovalent hydrocarbon group having from 1 to 10 carbon atoms, an epoxy group-containing organic group, an amino group-containing organic group, an acryl group-containing organic group, or a methacryl group-containing organic group. Examples of the monovalent hydrocarbon groups of $R^5$ include alkyl groups such as methyl groups, ethyl groups, propyl groups, butyl groups, and octyl groups; alkenyl groups such as vinyl groups, allyl groups, and hexenyl groups; aryl groups such as phenyl groups and tolyl groups; and halogenated alkyl groups such as 3,3,3-trifluoropropyl groups, 3-chloropropyl groups, and 3-cyanoalkyl groups, and methyl groups are preferable. Examples of the epoxy group-containing organic groups of $R^5$ include 3-glycidoxypropyl groups, 2-(2,3-epoxycyclohexyl)ethyl groups, and 3,4-epoxybutyl groups. Examples of the amino group-containing organic groups of $R^5$ include 3-aminopropyl groups and N-(2-aminoethyl)-3-aminopropyl groups. Examples of the acrylic group or methacrylic group-containing organic groups of $R^5$ include 3-acryloxypropyl groups and 3-methacryloxypropyl groups.

In addition, in the formula, Y is a silicon-bonded hydrolyzable group, examples of which include the same hydrolyzable groups as described above, and alkoxy groups, ketoximo groups, amino groups, and aminoxy groups are preferable.

In addition, in the formula, "y" is 0 or 1.

Examples of such component ($B_2$) include tetramethoxysilane, tetraethoxysilane, n-propylorthosilicate, methyl trimethoxysilane, methyl triethoxysilane, dimethyl dimethoxysilane, dimethyl diethoxysilane, vinyltrimethoxysilane, vinyl tris(2-methoxyethoxy)silane, 3-aminopropyl triethoxysilane, 3-glycidoxypropyl methyldimethoxysilane, tetrakis(methylethylketoximo)silane, methyl tris(methylethylketoximo)silane, vinyl tris(methylethylketoximo)silane, methyl triacetoxysilane, ethyl triacetoxysilane, methyl triisopropenoxysilane, tetraisopropenoxysilane, and methyl tris(N,N-diethylamino)silane.

A content of component ($B_2$) is an amount sufficient to crosslink component ($B_1$), and from a practical standpoint, the content is within the range of from 2 to 30 mass % of the present composition.

Component ($B_3$) is a condensation reaction promotion catalyst for promoting the condensation reaction of the present composition. Examples of such component ($B_3$) include organic tin compounds such as dibutyltin diacetate, dibutyltin dioctate, dibutyltin dilaurate, dibutyltin dimaleate, dioctyltin dilaurate, dioctyltin dimaleate, and tin octylate; organic titanate compounds such as tetra(i-propyl)titanate, tetra(n-butyl)titanate, dibutoxy bis(acetylacetonate)titanium, isopropyl triisostearoyl titanate, isopropyl tris(dioctylpyrophosphate)titanate, and bis(dioctylpyrophosphate) oxyacetate titanate; organic zirconium compounds such as tetrabutylzirconium, tetrakis(acetylacetonate)zirconium, tetraisobutylzirconium, butoxy tris(acetylacetonate)zirconium, and zirconium naphthenate; organic aluminum compounds such as tris(ethylacetoacetate)aluminum and tris(acetylacetonate)aluminum; organic acid metal salts such as zinc naphthenate, cobalt naphthenate, and cobalt octylate; and amine-based catalysts such as diethanolamine and triethanolamine. Note that when the present composition is a dealcoholization condensation reaction product, component ($B_3$) is preferably an organic tin compound or an organic titanate compound, and when the present composition is a deoxime condensation reaction product, component ($B_3$) is preferably an organic titanate compound.

Whether to include component ($B_3$) is optional, and when included, a content thereof is not particularly limited as long as it is an amount sufficient to promote the condensation reaction of the present composition. From a practical stand point, the content is not greater than 10 mass % or not greater than 5 mass % of the present composition, and preferably within the range of from 0.01 to 10 mass % or within the range of from 0.01 to 5 mass % of the present composition.

In addition, an addition reaction curable composition preferably comprises:
(A) the biuret compound described above, in an amount of from 0.1 to 15 mass % in the present composition;
($C_1$) an organopolysiloxane having at least two silicon atom-bonded alkenyl groups in each molecule;
($C_2$) an organohydrogenpolysiloxane having at least two silicon atom-bonded hydrogen atoms in each molecule, in an amount sufficient to crosslink component ($C_1$); and
($C_3$) a platinum group metal-based catalyst in an amount sufficient to promote an addition reaction of the present composition.

The biuret compound of component (A) is as described above.

Component ($C_1$) is an organopolysiloxane having at least two silicon atom-bonded alkenyl groups in each molecule. Examples of the alkenyl groups include vinyl groups, allyl groups, and propenyl groups, and vinyl groups are preferable. In addition, examples of silicon atom-bonded organic groups other than alkenyl groups in component ($C_1$) include alkyl groups such as methyl groups, ethyl groups, propyl groups, butyl groups, pentyl groups, hexyl groups, octyl groups, decyl groups, and dodecyl groups; aryl groups such as phenyl groups and tolyl groups; aralkyl groups such as benzyl groups and phenethyl groups; and halogen-substituted alkyl groups such as 3,3,3-trifluoropropyl groups and 3-chloropropyl groups. A molecular structure of component ($C_1$) is not particularly limited, and examples thereof include a straight-chain structure, a branched straight-chain structure, a cyclic structure, and a network structure, while a straight-chain structure is preferable. Component ($C_1$) may be a single organopolysiloxane or a mixture of two or more types of organopolysiloxanes. A viscosity of component ($C_1$) at 25° C. is not particularly limited, and this component can be used in a state from a liquid having a low viscosity to a raw rubber having a high viscosity, however, from the perspective of ensuring excellent mechanical properties in the obtained cured product, the viscosity is preferably not less than 100 mPa·s.

Component ($C_2$) is an organohydrogenpolysiloxane having at least two silicon atom-bonded hydrogen atoms in each molecule. Examples of the silicon atom-bonded organic groups of component ($C_2$) include alkyl groups such as methyl groups, ethyl groups, and propyl groups; aryl groups such as phenyl groups and tolyl groups; and halogen-substituted alkyl groups such as 3,3,3-trifluoropropyl groups and 3-chloropropyl groups. A molecular structure of component ($C_2$) is not limited, and examples thereof include a straight-chain structure, a branched straight-chain structure, a cyclic structure, and a network structure. Component ($C_2$) may be a single organohydrogenpolysiloxane or a mixture of two or more types of organohydrogenpolysiloxanes. A viscosity of component ($C_2$) at 25° C. is not limited, however, the viscosity is preferably within a range of from 3 to 10,000 mPa·s.

A content of component ($C_2$) is not particularly limited as long as the content is an amount sufficient to crosslink component ($C_1$). From a practical standpoint, the content is an amount such that a ratio of moles of silicon atom-bonded hydrogen atoms in component ($C_2$) to moles of silicon atom-bonded alkenyl groups in component ($C_1$) is from 0.4:1 to 20:1 and preferably from 0.5:1 to 10:1 or from 1:1 to 3:1. This is because when the content of component ($C_2$) is not less than the lower limit of the range described above, the curing of the present composition progresses sufficiently whereas when the content is not greater than the upper limit of the range described above, the resulting cured product is less susceptible to bubbling.

Component ($C_3$) is a platinum group metal-based catalyst for promoting the addition reaction of the present composition. Examples thereof include platinum-based catalysts such as chloroplatinic acid, alcohol solutions of chloroplatinic acid, olefin complexes of platinum, vinylsiloxane complexes of platinum, acetylene compound complexes of platinum, platinum black, and catalysts in which platinum is supported on a solid surface; palladium-based catalysts such as tetrakis(triphenylphosphine)palladium; and rhodium-based catalysts such as chloro tris(triphenylphosphine)rhodium; and platinum-based catalysts are particularly preferable.

A content of component ($C_3$) is not particularly limited as long as the content is sufficient to promote the addition reaction of the present composition, and from a practical standpoint, the content is preferably an amount such that an amount of the catalyst metal element in component ($C_3$) is in a range of from 0.1 to 500 parts by mass and preferably in a range of from 1 to 50 parts by mass per million parts by mass of the present composition. This is because when the content of component ($C_3$) is not less than the lower limit of the range described above, the present composition is sufficiently cured, whereas when the content is not greater than the upper limit of the range described above, problems such as discoloration of the resulting cured product are less likely to occur.

As long as the object of the present invention is not inhibited, the present composition may comprise, as other optional components, reinforcing fillers such as known precipitated silica, fumed silica, calcined silica, and fumed titanium oxide to adjust fluidity of the present composition or to enhance mechanical strength of the resulting cured product; non-reinforcing fillers such as ground quartz, crystalline silica, diatomaceous earth, aluminosilicate, iron oxide, zinc oxide, and calcium carbonate; and compositions in which these fillers are surface-treated with an organic silicon compound such as an organosilane or an organosiloxane. Further, the composition may comprise carbon blacks such as acetylene black, furnace black, or channel black; and, if necessary, pigments, heat resistant agents, flame retardants, internal mold release agents, plasticizers, normal adhesion promoters, and mold inhibitors.

In addition, the addition reaction curable present composition may also comprise a reaction inhibitor in order to enhance handling or workability thereof. Examples of the reaction inhibitors include: alkyne alcohols such as 2-methyl-3-butyn-2-ol, 3,5-dimethyl-1-hexyn-3-ol, and 2-phenyl-3-butyn-2-ol; enyne compounds such as 3-methyl-3-penten-1-yne and 3,5-dimethyl-3-hexen-1-yne; 1,3,5,7-tetramethyl-1,3,5,7-tetravinyl cyclotetrasiloxane; 1,3,5,7-tetramethyl-1,3,5,7-tetrahexenyl cyclotetrasiloxane; and benzotriazole.

A content of the reaction inhibitor is not limited, but is within a range of from 0.0001 to 5 mass % and preferably within a range of from 0.0001 to 2 mass % in the present composition. This is because when the content of the reaction inhibitor is not less than the lower limit of the range described above, a pot life of the present composition improves and workability improves, whereas when the content is not greater than the upper limit of the reaction described above, curability of the present composition improves.

EXAMPLES

The curable silicone rubber composition of the present invention will be described in detail hereinafter using examples. Note that in the examples, the viscosity is a value at 25° C.

Reference Example 1

First, 14.2 g (79 mmol) of 3-aminopropyl trimethoxysilane was charged into a 100 cc flask, and 25.8 g (126 mmol) of 3-isocyanatepropyl trimethoxysilane was added dropwise over the course of 60 minutes and reacted while stirring at room temperature. Upon completion of the drop-wise addition, they were further stirred for 60 minutes to obtain a reaction mixture containing 54 mass % of a biuret compound represented by the formula:

[Formula 10]

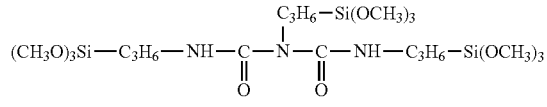

and 46 mass % of a urea compound represented by the formula:

[Formula 11]

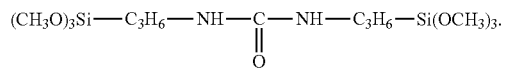

Reference Example 2

First, 21 g (117 mmol) of 3-aminopropyl trimethoxysilane was charged into a 100 cc flask, and 19 g (93 mmol) of 3-isocyanatepropyl trimethoxysilane was added dropwise over the course of 60 minutes and reacted while stirring at room temperature. Upon completion of the drop-wise addition, they were further stirred for 60 minutes to obtain a reaction mixture containing 80 mass % of a urea compound represented by the formula:

[Formula 12]

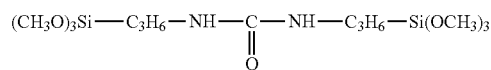

and 20 mass % of unreacted 3-aminopropyltrimethoxysilane.

Reference Example 3

First, 100 parts by mass of a polydimethylsiloxane capped at both molecular terminals with dimethylhydroxysiloxy groups and having a viscosity of 16,500 mPa·s, and 70 parts by mass of stearic acid-treated calcium carbonate having a BET specific surface area of 21 m²/g were charged into a Ross mixer, mixed until uniform at room temperature, and then degassed under reduced pressure to prepare a silicone rubber base.

Reference Example 4

First, 100 parts by mass of a dimethylpolysiloxane capped at both molecular terminals with dimethylvinylsiloxy groups having a viscosity of 40,000 mPa·s, 40 parts by mass of fumed silica having a BET specific surface area of 400 m²/g, 7 parts by mass of hexamethyldisilazane, and 1.7 parts by mass of water were charged into a Ross mixer, mixed until uniform at room temperature, and then heat-treated for two hours at 200° C. under reduced pressure to prepare a silicone rubber base having fluidity.

Reference Example 5

First, 85 parts by mass of a dimethylsiloxane·methylvinylsiloxane copolymer capped at both molecular terminals with trimethylsiloxy groups and having a viscosity of 40,000 mPa·s (vinyl group content=0.13 mass %) and 15 parts by mass of acetylene black (Denka Black: manufactured by Denki Kagaku Kogyo K.K.) were charged into a Ross mixer, mixed until uniform at room temperature, and passed five times through a three-roll mill to prepare a pigment paste having fluidity.

Reference Example 6

First, 72 parts by mass of dimethylpolysiloxane capped at both molecular terminals with trimethylsiloxy groups and having a viscosity of 9,800 mPa·s, and 28 parts by mass of acetylene black (Denka Black: manufactured by Denki Kagaku Kogyo K.K.) were charged into a Ross mixer, mixed until uniform at room temperature, and passed five times through a three-roll mill to prepare a pigment paste having fluidity.

Example 1 and Comparative Examples 1 to 5

Condensation reaction curable silicone rubber compositions were prepared with the compositions shown in Table 1 using the following components.

The following was used as a silicone rubber base.

Silicone rubber base (1): silicone rubber base prepared in Reference Example 3

The following were used as pigment pastes.

Pigment paste (1): pigment paste prepared in Reference Example 5

Pigment paste (2): pigment paste prepared in Reference Example 6

The following was used as a silane crosslinking agent.

Silane crosslinking agent: 1,6-bis(trimethoxysilyl)hexane

The following were used as condensation reaction catalysts.

Condensation reaction catalyst (1): dimethyltin dineodecanoate to cure for 30 minutes in a 60° C. oven. The composition was heated for 30 minutes at 60° C., and the curing state and adhesion was observed. Cases in which the composition cured with good adhesion was evaluated as "○"; cases in which peeling was observed was evaluated as "Δ", and compositions that did not cure was evaluated as "x".

<Heat-Resistant Adhesion>

After the initial adhesion was confirmed for the compositions exhibiting good initial adhesion in the initial adhesion evaluation described above, the composition was immediately placed in an oven at 130° C. and heated for 10 days. The composition was then cooled to room temperature, and the adhesive state was observed. Compositions exhibiting sufficient adhesion was evaluated as "○"; and cases in which gas pockets was observed at the interface between the adherend and the rubber layer or cases in which peeling was observed was evaluated as "x".

TABLE 1

| | | | Segment | | | | |
| --- | --- | --- | --- | --- | --- | --- | --- |
| | | | | Comparative Example | | | | |
| | Items | Present Invention Example 1 | Comp. Exam. 1 | Comp. Exam. 2 | Comp. Exam. 3 | Comp. Exam. 4 | Comp. Exam. 5 |
| Composition of curable silicone rubber composition (parts by mass) | Silicone rubber base (1) | 100 | 100 | 100 | 100 | 100 | 100 |
| | Pigment paste (1) | 3.1 | — | 3.1 | 3.1 | — | — |
| | Pigment paste (2) | — | 0.5 | — | — | 0.5 | 0.5 |
| | Silane crosslinking agent | 2.1 | 3.9 | 2.1 | 2.1 | — | — |
| | Condensation reactive catalyst (1) | 0.06 | — | 0.03 | 0.06 | — | — |
| | Condensation reactive catalyst (2) | — | 8.1 | — | — | 8.1 | 8.1 |
| | Adhesion promoter (1) | 2.0 | — | — | — | — | — |
| | Adhesion promoter (2) | — | — | 2.0 | — | — | — |
| | Adhesion promoter (3) | — | — | — | 0.7 | — | — |
| | Adhesion promoter (4) | — | — | — | 1.3 | 3.9 | — |
| | Adhesion promoter (5) | — | — | — | — | — | 3.9 |
| Initial adhesion | | ○ | Δ | ○ | Δ | x | ○ |
| Heat-resistant adhesion | | ○ | — | x | — | — | x |

Condensation reaction catalyst (2): dimethyltin dineodecanoate dispersed in dimethylpolysiloxane capped at both molecular terminals with trimethylsiloxy groups and having a viscosity of 100 mm²/s.

The following were used as adhesion promoters.

Adhesion promoter (1): reaction mixture prepared in Reference Example 1

Adhesion promoter (2): reaction mixture prepared in Reference Example 2

Adhesion promoter (3): 3-aminopropyl trimethoxysilane

Adhesion promoter (4): 3-isocyanatepropyl trimethoxysilane

Adhesion promoter (5): 3-aminopropyl triethoxysilane

The initial adhesion and heat-resistant adhesion of the curable silicone rubber compositions prepared in Example 1 and Comparative Examples 1 to 5 were evaluated as follows, and the results are shown in Table 1. Note that in Comparative Examples 4 and 5, the adhesion promoter also served as a silane crosslinking agent.

<Initial Adhesion>

After the curable silicone rubber composition was applied to a thickness of 1 mm between two polycarbonate resin adherends (50 mm×50 mm×5 mm), the composition was left

Example 2 and Comparative Example 6

Addition reaction curable silicone rubber compositions were prepared with the compositions shown in Table 2 using the following components.

The following was used as a silicone rubber base.

Silicone rubber base (2): silicone rubber base prepared in Reference Example 4

The following was used as a viscosity adjusting agent.

Viscosity adjusting agent: dimethylsiloxane·methylvinylsiloxane copolymer capped at both molecular terminals with dimethylvinylsiloxy groups and having a viscosity of 350 mPa·s (vinyl group content=1.17 mass %)

The following was used as a crosslinking agent.

Crosslinking agent: organopolysiloxane having a dynamic viscosity of 12 mm²/s and represented by the following average unit formula:

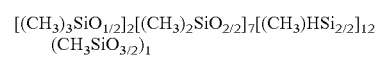

(silicon atom-bonded hydrogen atom content=approximately 0.83 mass %)

The following was used as a platinum group metal-based catalyst.

Curing catalyst: 1,3-divinyltetramethyldisiloxane solution of a 1,3-divinyltetramethyldisiloxane complex of platinum (platinum metal content=approximately 7,000 ppm)

The following was used as a reaction inhibitor.

Reaction inhibitor: a mixture of 2 parts by mass of 1-ethynylcyclohexan-1-ol and 98 parts by mass of a dimethylpolysiloxane capped at both molecular terminals with dimethylvinylsiloxy groups and having a viscosity of 10,000 mPa·s (vinyl group content=approximately 0.13 mass %)

The following was used as an adhesion promoter.

Adhesion promoter (1): reaction mixture prepared in Reference Example 1

The curability and adhesion of the curable silicone rubber compositions prepared in Example 2 and Comparative Example 6 were evaluated as follows, and the results are shown in Table 2.

<Curability>

The following vulcanization characteristics of the curable silicone rubber composition were measured at 130° C./3 minutes using a Curelastomer III type (manufactured by JSR) in accordance with JIS K6300.

T10: Time required for the vulcanization to progress 10% from the start of heating (that is, until the torque reaches 10% of the maximum torque value MH in the vulcanization curve) (=vulcanization starting point)

T90: Time required for the vulcanization to progress 90% from the start of heating (that is, until the torque reaches 10% of the maximum torque value MH in the vulcanization curve) (=optimum vulcanization point)

<Adhesion>

The curable silicone rubber composition was applied to a thickness of 1 mm to a 25 mm×75 mm×1 mm adherend (polycarbonate resin: PC, acrylonitrile butadiene styrene copolymer resin: ABS, polyethylene terephthalate resin: PET, polybutylene terephthalate resin: PBT, stainless steel: SUS), and after the composition was heated for 10 minutes in an oven at 130° C., the composition was cooled and the adhesive state of the silicone rubber was observed. The composition in which the rubber layer exhibited cohesive failure was evaluated as "○", and composition which exhibited peeling at the interface with the adherend was evaluated as "x".

TABLE 2

| | | Present Invention Example 2 | Comparative Example Comparative Example 6 |
|---|---|---|---|
| Composition of curable silicone rubber composition (parts by mass) | Silicone rubber base (2) | 100 | 100 |
| | Viscosity adjusting agent | 20 | 20 |
| | Crosslinking agent | 2.2 | 2.2 |
| | Curing catalyst | 0.08 | 0.08 |
| | Reaction inhibitor | 1.5 | 1.5 |
| | Adhesion promoter (1) | 1.24 | 0 |
| Curability | T10 | 39 | 36 |
| | T90 | 90 | 63 |
| Adhesion | PC | ○ | x |
| | ABS | ○ | x |
| | PET | ○ | x |
| | PBT | ○ | x |
| | SUS | ○ | x |

INDUSTRIAL APPLICABILITY

The curable silicone rubber composition of the present invention has good adhesion to plastics such as polycarbonate resins, metals, and the like, and can therefore be suitably used as an adhesive, a sealing agent, or a coating agent.

The invention claimed is:

1. A curable silicone rubber composition containing 0.1 to 15 mass % of a biuret compound represented by the general formula:

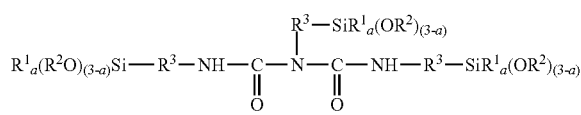

wherein $R^1$ represents the same or different alkyl groups having 1 to 6 carbons, $R^2$ represents the same or different alkyl groups having 1 to 3 carbons, $R^3$ represents the same or different alkylene groups having 2 to 6 carbons, and "a" represents the same or different integers of from 0 to 2.

2. The curable silicone rubber composition according to claim 1, wherein the biuret compound is a reaction product of an aminoalkyl alkoxysilane represented by the general formula:

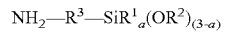

wherein $R^1$ is an alkyl group having 1 to 6 carbons, $R^2$ is an alkyl group having 1 to 3 carbons, $R^3$ is an alkylene group having 2 to 6 carbons, and "a" is an integer from 0 to 2; and an isocyanate alkyl alkoxysilane represented by the general formula:

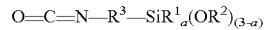

wherein $R^1$ represents the same alkyl groups as described above or different alkyl groups having 1 to 6 carbons, $R^2$ represents the same alkyl groups as described above or different alkyl groups having 1 to 3 carbons, $R^3$ represents the same alkylene group as described above or different alkylene group having 2 to 6 carbons, and "a" represents the same integers as described above or different integer of from 0 to 2.

3. The curable silicone rubber composition according to claim 2, wherein the biuret compound is a reaction product with a molar ratio of 1:1.5 to 1:3 of the aminoalkyl alkoxysilane and the isocyanate alkyl alkoxysilane.

4. The curable silicone rubber composition according to claim 1, wherein the curable silicone rubber composition is in the form of a condensation reaction curable silicone rubber composition.

5. The curable silicone rubber composition according to claim 4, wherein the condensation reaction curable silicone rubber composition comprises:

(A) a biuret compound represented by the general formula:

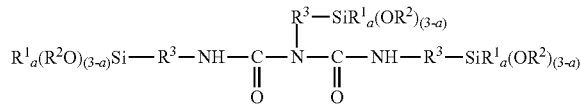

wherein $R^1$ represents the same or different alkyl groups having 1 to 6 carbons, $R^2$ represents the same or different alkyl groups having 1 to 3 carbons, $R^3$ represents the same or different alkylene groups having 2 to 6 carbons, and "a" represents the same or different integers of from 0 to 2, in an amount of from 0.1 to 15 mass % in the composition;

($B_1$) a diorganopolysiloxane capped at both molecular terminals with silicon atom-bonded hydroxyl groups or silicon atom-bonded hydrolyzable groups;

($B_2$) a silane crosslinking agent having a silicon atom-bonded hydrolyzable group, in an amount sufficient to crosslink component ($B_1$); and ($B_3$) a condensation reaction promotion catalyst for promoting a condensation reaction of the composition.

6. The curable silicone rubber composition according to claim 1, wherein the curable silicone rubber composition is in the form of an addition reaction curable silicone rubber composition.

7. The curable silicone rubber composition according to claim 6, wherein the addition reaction curable silicone rubber composition comprises:

(A) a biuret compound represented by the general formula:

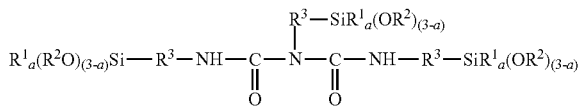

wherein $R^1$ represents the same or different alkyl groups having 1 to 6 carbons, $R^2$ represents the same or different alkyl groups having 1 to 3 carbons, $R^3$ represents the same or different alkylene groups having 2 to 6 carbons, and "a" represents the same or different integers of from 0 to 2, in an amount of from 0.1 to 15 mass % in the composition;

($C_1$) an organopolysiloxane having at least two silicon atom-bonded alkenyl groups in each molecule;

($C_2$) an organohydrogenpolysiloxane having at least two silicon atom-bonded hydrogen atoms in each molecule, in an amount sufficient to cros slink component ($C_1$); and ($C_3$) a platinum group metal-based catalyst in an amount sufficient to promote an addition reaction of the composition.

* * * * *